United States Patent
Betzina et al.

(10) Patent No.: US 6,671,590 B1
(45) Date of Patent: Dec. 30, 2003

(54) METHOD AND SYSTEM FOR ACTIVE NOISE CONTROL OF TILTROTOR AIRCRAFT

(75) Inventors: Mark D. Betzina, Los Gatos, CA (US); Khanh Q. Nguyen, Glendale, AZ (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/139,256

(22) Filed: Apr. 30, 2002

Related U.S. Application Data

(60) Provisional application No. 60/287,803, filed on Apr. 30, 2001.

(51) Int. Cl.[7] ................................................. B64C 1/00
(52) U.S. Cl. ............................... 701/3; 415/119; 416/87
(58) Field of Search ........................... 701/3; 244/17.11, 244/207, 199; 415/119, 92; 416/90 A, 87, 24

(56) References Cited

U.S. PATENT DOCUMENTS

| | | | |
|---|---|---|---|
| 4,953,098 A | 8/1990 | Fischer, Jr. et al. | 702/56 |
| 5,217,349 A | 6/1993 | Succi | 415/119 |
| 5,253,979 A | * 10/1993 | Fradenburgh et al. | 416/87 |
| 5,314,308 A | 5/1994 | Reed, III | 416/91 |
| 5,562,414 A | 10/1996 | Azuma | 416/90 |
| 5,588,800 A | 12/1996 | Charles et al. | 416/24 |
| 5,620,303 A | 4/1997 | Moffitt et al. | 416/87 |
| 5,620,304 A | 4/1997 | Matsuka et al. | 416/87 |
| 5,655,878 A | 8/1997 | Yamakawa et al. | 416/31 |
| 5,681,145 A | 10/1997 | Neely et al. | 416/203 |
| 5,709,357 A | 1/1998 | Von Wilmowsky | 244/7 R |
| 5,711,651 A | 1/1998 | Charles et al. | 416/24 |
| 5,735,670 A | 4/1998 | Moffitt et al. | 416/87 |
| 5,785,282 A | 7/1998 | Wake et al. | 244/199 |
| 5,788,191 A | 8/1998 | Wake et al. | 244/199 |
| 5,813,625 A | 9/1998 | Hassan et al. | 244/17.11 |
| 5,961,067 A | 10/1999 | Hall et al. | 244/1 N |
| 6,161,800 A | 12/2000 | Liu et al. | 244/7 R |
| 2001/0001033 A1 | * 5/2001 | Karem | 416/44 |

FOREIGN PATENT DOCUMENTS

| | | | | |
|---|---|---|---|---|
| DE | 3903740 A | * | 9/1989 | F01C/1/02 |
| WO | WO 01/10712 A1 | | 2/2001 | B64C/29/00 |

OTHER PUBLICATIONS

Khanh Nguyen, Mark Betzina, Cahit Kitaplioglu, "Full–Scale Demonstration of Higher Harmonic Control for Noise and Vibration Reduction on the XV–15 Rotor," American Helicopter Society 56th Annual Forum, Virginia Beach, VA, May 2–4, 2000.

* cited by examiner

*Primary Examiner*—Marthe Y. Marc-Coleman
(74) *Attorney, Agent, or Firm*—Robert M. Padilla; Carla M. Wong

(57) ABSTRACT

Methods and systems for reducing noise generated by rotating blades of a tiltrotor aircraft. A rotor-blade pitch angle associated with the tiltrotor aircraft can be controlled utilizing a swashplate connected to rotating blades of the tiltrotor aircraft. One or more Higher Harmonic Control (HHC) signals can be transmitted and input to a swashplate control actuator associated with the swashplate. A particular blade pitch oscillation (e.g., four cycles per revolution) is thereafter produced in a rotating frame of reference associated with the rotating blades in response to input of an HHC signal to the swashplate control actuator associated with the swashplate to thereby reduce noise associated with the rotating blades of the tiltrotor aircraft. The HHC signal can be transmitted and input to the swashplate control actuator to reduce noise of the tiltrotor aircraft in response to a user input utilizing an open-loop configuration.

17 Claims, 8 Drawing Sheets

METHOD AND SYSTEM FOR ACTIVE NOISE CONTROL OF TILTROTOR AIRCRAFT

CROSS-REFERENCE TO RELATED PATENT APPLICATIONS

This patent application claims the benefit of U.S. Provisional Patent Application Serial No. 60/287,803, which was filed on Apr. 30, 2001 by Mark D. Betzina and Khanh Q. Nguyen for "Method and System for Active Noise Control of Tiltrotor Aircraft."

ORIGIN OF THE INVENTION

The invention described herein was made by employees of the United States Government and may be manufactured and used by or for the Government for governmental purposes without payment of any royalties thereon or therefore.

BACKGROUND OF THE INVENTION

1. Technical Field of the Invention

The present invention also relates to noise reduction methods and systems for tiltrotor aircraft. The present invention additionally relates to methods and systems, which utilize Higher Harmonic Control (HHC) noise reduction techniques for tiltrotor aircraft.

2. Description of the Prior Art

Tiltrotor aircraft have pivoting motors mounted at the wing tips that permit the aircraft to take-off and land like helicopters, but also fly like propeller aircraft. When operated in helicopter mode, the rotors of these aircraft generate more thrust per unit rotor disk area than helicopter rotors, thus producing higher Blade-Vortex Interaction (BVI) noise levels. BVI is a major source of noise produced by helicopters and tiltrotor aircraft during descending flight.

As a rotor descends into its own wake, large air pressure fluctuations are generated on the rotor blade surfaces as each blade interacts with the blade tip vortices generated previously. These pressure fluctuations radiate as distinctly impulsive noise, with frequency content concentrated in the sensitive audible range. This can create a community disturbance that severely restricts operations of tiltrotor aircraft in populated areas. Humans can perceive this BVI noise as particularly objectionable. In addition, BVI noise can be detected at large distances from the vehicle.

An increasing number of airports are approaching their capacity in the number of flights that can be handled daily by existing runways. As a result, the civil aviation industry has recently been considering other means of transportation, such as tiltrotor aircraft. Tiltrotor aircraft thus have great potential to relieve airport congestion due to the ability of such aircraft to take off and land vertically while flying like an airplane during cruise, thus reducing the demand on airport runways. It is anticipated that the use of tiltrotor aircraft may significantly add additional capacity to airports and reduce delays. It is also expected that a significant reduction of door-to-door trip times for passengers may be implemented utilizing tiltrotor aircraft by circumventing ground and air congestion.

Tiltrotor aircraft may thus someday be utilized to ferry passengers directly to and from vertiports located near urban areas and mass transit. However, the noise levels generated by these aircraft during landing approach have raised concerns. The noise generated by a larger, 40-passenger tiltrotor aircraft, for example, is similar to that generated by the V-22 Osprey, a current military application of a tiltrotor aircraft. Such noise may be a potential barrier to civil market penetration. The development of low-noise tiltrotors is essential to the successful implementation of this revolutionary mode of air transportation and greatly expands the utility of tiltrotor aircraft.

Passive techniques for rotorcraft noise reduction include non-traditional blade planforms, devices mounted at the blade tips, and rotor speed reduction. These methods can impose several penalties on aircraft performance and rotor structural loads, and often require a major redesign of the rotor system. Such techniques have not yet produced benefits that justify the added complexity and cost. Attempts to develop low-noise approach flight profiles have shown some potential for noise reductions. Modifying the landing profile, however, may reduce noise only moderately and can severely restrict the operations of tiltrotor aircraft during one of the most critical phases of flight.

Passive noise reductions have not been very successful. Those that require modifications to the rotor blade design generally require extensive development costs and typically involve performance penalties over the entire flight envelope. Rotor speed reduction can be effective, but is generally detrimental to hover performance and typically requires modifications to the transmission to provide higher torque, which is expensive and adds weight.

Active control devices, such as rotor-blade flaps, tabs, or variable geometry have been proposed for rotorcraft noise reduction, but have yielded only small noise reduction levels. With this approach, a blade-mounted device may be actuated either continuously or over a limited portion of the blade's revolution. Another active control approach generally involves pitch variance of the entire rotor blade at high frequencies utilizing either a conventional swash plate or individual blade-pitch actuators. The term "Higher Harmonic Control," generally represented by the acronym HHC, refers to any of these active control methods that operate throughout the entire blade revolution as a multiple (i.e., higher harmonic) of the blade rotational frequency.

Determining the proper frequency and phase (i.e., HHC setting) of the dynamic control input is critical to the effectiveness of active control methods of noise reduction and is a major difficulty in developing an effective HHC system. Closed-loop HHC systems have been proposed to reduce helicopter vibration and blade loads. These systems, however, often require complex control algorithms and sophisticated sensors to operate effectively over the entire range of flight conditions necessary for successful implementation on a rotorcraft.

Small changes in flight condition often require significant changes in the HHC setting, requiring a very responsive and robust control system. For example, to determine the proper HHC setting, prior-art systems and techniques thereof utilize measured parameters in a closed-loop feedback system that seeks to minimize or optimize those measured parameters. The feedback system utilizes an algorithm to determine an HHC setting, which is then modified based on the response of the measured parameters. This process is iterated by a computer-control system until an optimal HHC setting is identified.

Thus, development of closed-loop HHC systems can be expensive and time consuming. In most cases, however, determining suitable feedback measurements has proven to be an additional complication and a significant challenge.

The present inventors have thus concluded that a need exists for simple, yet highly effective and safe, implementation of a noise reduction system for tiltrotor aircraft based on Higher Harmonic Control (HHC) technology. The present inventors believe that a significant noise reduction can be achieved without a closed-loop system, which is a significant and novel departure from prior art assumptions.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with addressing the shortcomings of the prior art, it is one aspect of the present invention to provide methods and systems for reducing noise generated by aircraft.

It is an additional aspect of the present invention to provide methods and systems for reducing noise generated by tiltrotor aircraft.

It is another aspect of the present invention to provide methods and systems, including hardware and software implementations thereof, for reducing noise generated by tiltrotor aircraft during descent of the tiltrotor aircraft.

It is yet another aspect of the present invention to provide methods and systems, including hardware and software implementations thereof, for reducing noise generated by tiltrotor aircraft during a variety of different flight conditions.

It is also an aspect of the present invention to provide methods and systems, including hardware and software implementations thereof, for reducing noise generated by tiltrotor aircraft utilizing a Higher Harmonic Control (HHC) input.

It is still another aspect of the present invention to provide methods and systems for reducing noise generated by tiltrotor aircraft utilizing an open-loop HHC input configuration.

In accordance with various aspects of the invention, methods and systems are disclosed herein for reducing noise generated by rotating blades of a tiltrotor aircraft. Generally, a rotor-blade pitch angle associated with the tiltrotor aircraft can be controlled utilizing a swashplate connected to the rotating blades of the tiltrotor aircraft by pitch links. One or more Higher Harmonic Control (HHC) signals can be transmitted and input to a swashplate control actuator associated with the swashplate. Rotor-blade pitch oscillations can thereafter be produced in a rotating frame of reference associated with the rotating blades to thereby reduce noise associated with the rotating blades of the tiltrotor aircraft.

The transmission of the HHC signal to the swashplate control actuator can occur in response to user input to a user input interface, such as, for example, a pilot-controlled switch in the cockpit of the tiltrotor aircraft. Additionally, transmission of the HHC signal to the swashplate control actuator can produce rotor-blade pitch oscillations of the rotating blades at 4 cycles per revolution in a rotating frame of reference associated with the rotating blades. The phase of the rotor-blade pitch oscillations can be controlled such that the 4/rev component of the rotor-blade pitch angle is a minimum at a rotor-blade azimuth angle within a range from 60 degrees up to and including 90 degrees.

The phase associated with the rotor-blade pitch oscillation can be optimized for minimum noise at a fixed phase setting. The HHC control signal can preferably be transmitted to one or more swashplate control actuators through an open-loop configuration. Finally, the phase associated with the HHC control signal can be optimized for particular flight conditions and/or descent profiles associated with the tiltrotor aircraft.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
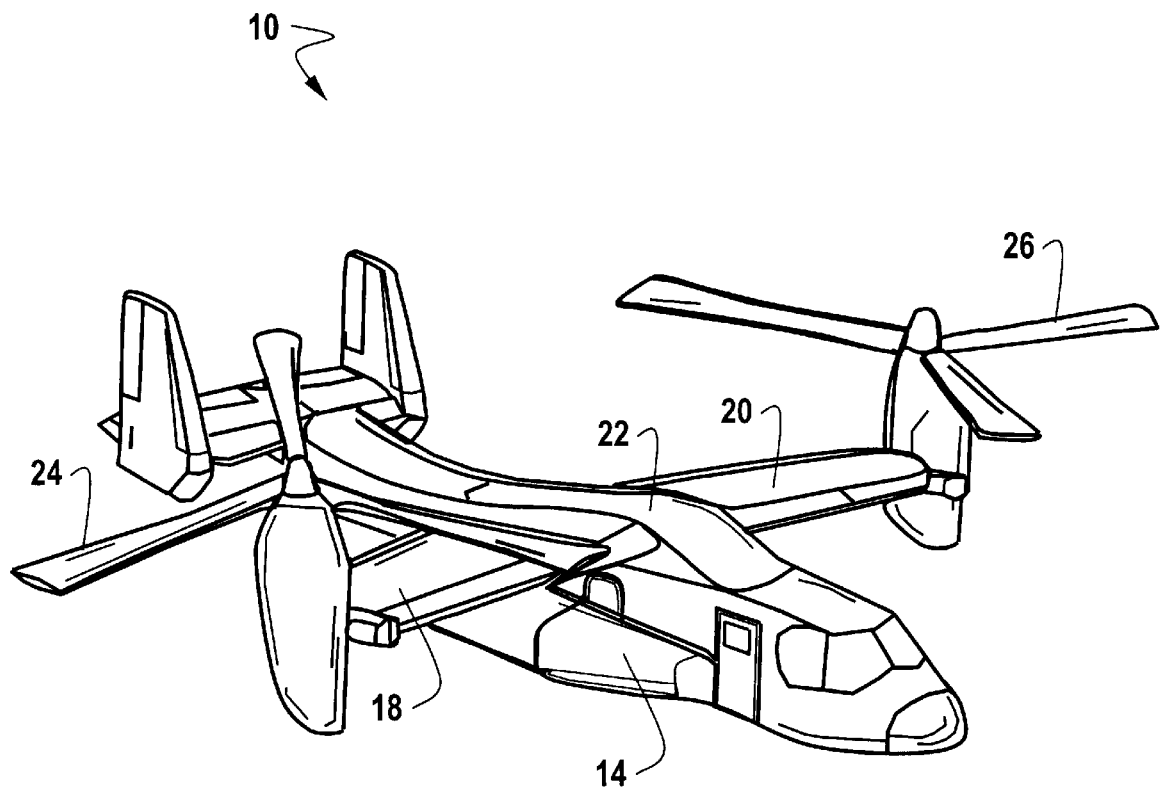
FIG. 1 illustrates a pictorial diagram illustrative of a tiltrotor aircraft in which the present invention may be implemented.

FIG. 1 illustrates a pictorial diagram illustrative of a tiltrotor aircraft 10 in which the present invention may be implemented. Those skilled in the art can appreciate that tiltrotor aircraft 10 represents merely one example of a tiltrotor aircraft that may be utilized in accordance with preferred embodiments of the present invention. Tiltrotor aircraft 10 is presented herein for illustrative purposes only. Other types of tiltrotor aircraft may also be utilized to implement varying embodiments of the present invention.

Thus, referring to FIG. 1, tiltrotor aircraft 10 generally includes a fuselage 14, a pair of generally-oppositely-extending, forward-swept wings 18 and 20 on the fuselage 14, separated by a mid-fuselage area 22 and a pair of driven rotors 24 and 26 respectively mounted for rotation on the wings 18 and 20 between a forward-flight position and a hover position (i.e., the driven rotors 24, 26 being illustrated in the hover or helicopter position in FIG. 1). Tiltrotor aircraft 10 thus has the ability to take off and land vertically while flying like an airplane during cruise.

Those skilled in the art can appreciate tiltrotor aircraft 10 can be implemented with a different number of blades. For example, tiltrotor aircraft 10 can be configured as a 3-bladed, 4-bladed or 5-bladed tiltrotor aircraft. An example of tiltrotor aircraft 10 is the V-22 Osprey tiltrotor aircraft. Although the V-22 Osprey is generally utilized in military environments, tiltrotor aircraft 10 may be implemented as civilian tiltrotor aircraft for carrying passengers to and from civilian airports and other transportation centers in urban areas.

The present invention provides a simple, yet highly effective and safe, implementation of noise reduction for tiltrotor aircraft, such as, for example, tiltotor aircraft 10 illustrated in FIG. 1. The noise reduction system and related methods of the present invention, including software implementations thereof, are based on Higher Harmonic Control (HHC) technology. In accordance with the present invention, it has been discovered by the present inventors that a specific HHC input can result in a very large BVI noise reduction. The present invention may be applied to tiltrotor aircraft in such a manner that the required control input is insensitive to changes in flight condition. Utilizing implementations of the present invention, significant noise reduction can be achieved without relying on a closed-loop configuration or system that includes multiple sensors and sophisticated control algorithms.

Current tiltrotor aircraft utilize a swashplate to control the rotor-blade pitch angle. Each rotating blade is generally connected to the swashplate by a pitch link. As the control actuators tilt the swashplate, a sinusoidal blade pitch oscillation is produced at a frequency of one cycle per rotor revolution. In a preferred embodiment of the present invention, dynamic oscillation of the swashplate at a frequency of N cycles per rotor revolution in the non-rotating frame of reference is generally relied upon, wherein N represents the number of rotor blades. Thus, these swashplate motions can produce sinusoidal blade pitch oscillations at N−1, N, and N+1 cycles per rotor revolution in the rotating frame of reference.

In the present invention, an HHC input is generally transmitted to the swashplate control actuators in order to produce rotor-blade oscillations at 4 cycles per revolution in the rotating frame of reference. The phase of the rotor-blade pitch oscillation is critical, and can be designed to yield a minimum 4/rev component of rotor-blade pitch at a rotor-blade azimuth angle of at least 60 degrees, but preferably between 60 degrees and 90 degrees, wherein the zero degree azimuth position is located where the rotating rotor blade of the tiltrotor aircraft is aligned directly aft on the aircraft. For a particular tiltrotor aircraft implementation, the phase may be optimized for minimum noise at a specific fixed setting within this range.

In accordance with the present invention, a pilot-controlled switch, which may be located in the cockpit of the tiltrotor aircraft, can be utilized to activate the HHC noise reduction system. Such a switch can thus be utilized when reduced noise is desired during descending flight while the tiltrotor aircraft is in "helicopter mode." Because such an HHC input system may be activated for a short period during the aircraft operation, the system may induce a rather small, if any, penalty on the life of the control system components. The noise reduction system is not required for safe operation of the vehicle, and therefore, it is fail-safe in a preferred embodiment of the present invention. The noise reduction system may thus be switched off at any time, without affecting the flight of the vehicle other than the noise produced.

Note that the amplitude of the HHC blade-pitch oscillation is not critical. The present inventors have demonstrated that a relatively small HHC amplitude (e.g., up to and including approximately 0.7 degrees) produces large noise reductions. Larger amplitudes, however, can produce even greater noise reduction, but are generally accompanied by increases in control loads. The noise reduction level may thus be limited by the fatigue life of control system structural components. In essence, noise can be reduced further with a larger HHC amplitude, but only at the cost of strengthening the control system structural components.

The present invention may be implemented in a tiltrotor aircraft through the use of a single open-loop input, as described above. Such a single open-loop input can be optimized for the typical descent profiles flown by that specific tiltrotor aircraft. Those skilled in the art can thus appreciate, based on the foregoing, that an advantage of the present invention is that a single specified input can be effective over a range of flight conditions. To obtain even greater noise reduction, however, the HHC input phase for several descending flight conditions can be optimized, particularly if the aircraft utilizes a very wide range of descent profiles. Such multiple HHC inputs can be predetermined and scheduled for specific flight conditions.

An infinite number of frequency and phase combinations may be implemented in a system utilizing HHC for noise reduction. The HHC noise reduction methods and systems disclosed herein, however, utilize a specific frequency and phase, which can each be predetermined and utilized effectively over a wide range of flight conditions.

The present invention, which discloses methods and systems for HHC noise reduction, can be implemented on existing tiltrotor aircraft without major modifications to the rotor system, and with relatively small costs and additionally, a small weight penalty. Feedback measurements are not required in order for the methods and systems of the present invention to be installed and maintained on existing tiltrotor aircraft. A new rotor design is also not required, as some noise reduction devices do, which would be much more difficult and expensive to implement on existing aircraft.

To implement the methods and systems of the present invention in existing tiltrotor aircraft, swashplate actuators are generally needed to produce the required dynamic motions and control system components that can withstand the resulting oscillatory loads. Structural modifications to existing control systems may not be required on current tiltrotor aircraft because components may already be designed to accommodate maneuvering load levels that are much higher than those encountered during normal descending flight. Therefore, HHC loads in this flight regime can be maintained within the structural limits of the existing components by pre-setting the HHC amplitude.

At particular HHC frequencies and phases, as disclosed herein, small blade-pitch amplitudes (i.e., up to and including approximately 0.7 degree) are generally required, thereby placing a low demand on the hydraulic flow rate for the swashplate actuators. This also keeps the control loads relatively low, extending the life of the system components and permitting lighter weight components. Because the HHC noise reduction system described herein is generally utilized for only a short time (i.e., during descent in helicopter mode), the system will not produce high maintenance demands on the tiltrotor aircraft.

The methods and systems described herein may also be implemented in the context of an optional low-noise package.

Wind tunnel data were acquired by the present inventors using a full scale XV-15 rotor at NASA Ames Research Center. These data are shown in FIGS. 2 to 7 illustrated herein and are based on a nominal descending flight condition where the ratio of velocity along the flight path to the rotor's tip velocity is equal to 0.15. Also in FIGS. 2 to 7, the rotor thrust coefficient divided by rotor solidity is equal to 0.09, and the rotor's tip-path-plane angle-of-attack is equal to −3 degrees (forward tilt). Additionally in FIGS. 2 to 7, the rotor's tip Mach number is equal to 0.691. These values were selected to be representative of a typical tiltrotor aircraft descending flight condition.

Figure 2:
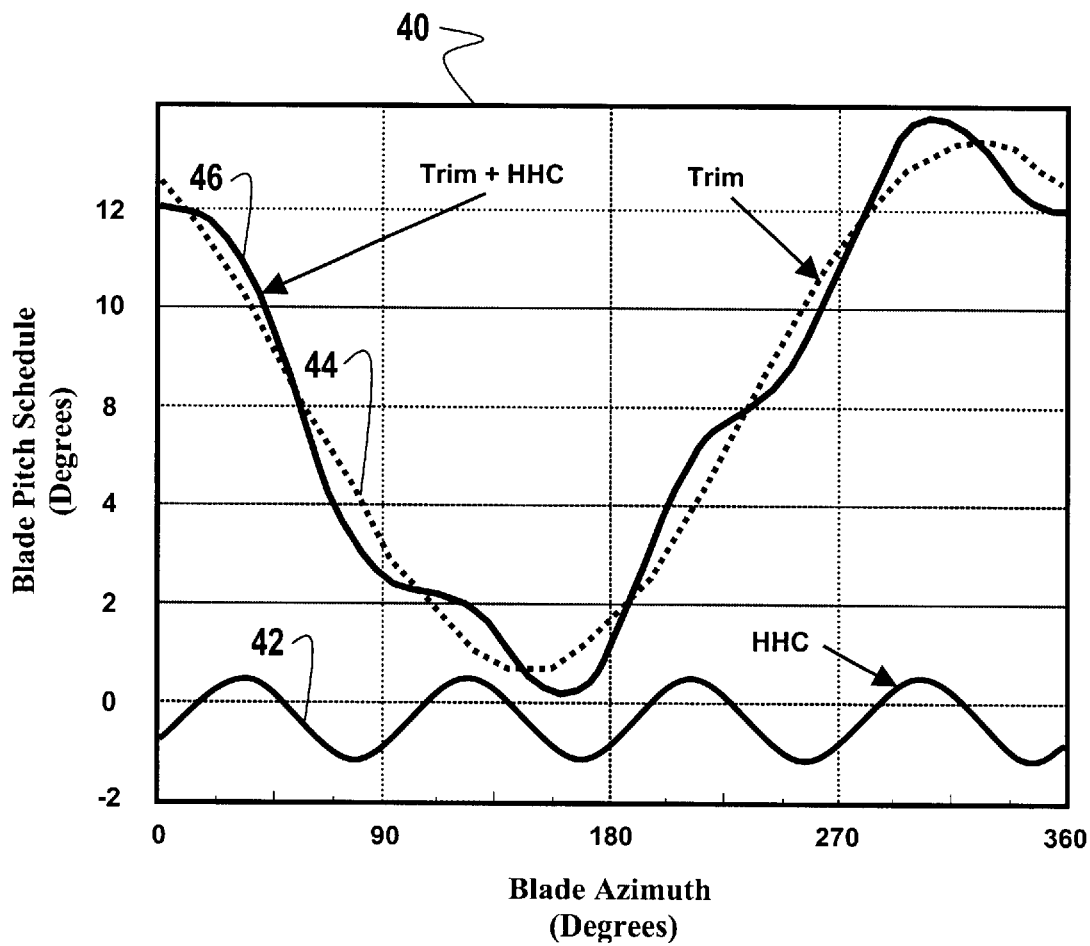
FIG. 2 depicts a graph illustrating a blade pitch schedule for producing large BVI noise reductions over a wide range of flight conditions, in accordance with preferred embodiments of the present invention.

FIG. 2 depicts a graph 40 illustrating a blade pitch schedule for producing large BVI noise reductions over a wide range of flight conditions, in accordance with preferred embodiments of the present invention. When an oscillating HHC input 42 illustrated at the bottom of graph 40 is superimposed on the trim blade pitch 44, a resulting blade pitch 46 is created. Note that trim blade pitch 44 is labeled as "Trim," in FIG. 2, and the resulting blade pitch 46 is labeled as "Trim+HHC". Note also that the phase of the oscillating HHC input 42 is within the preferred range, where the minimum blade pitch occurs at a blade azimuth angle between 60 degrees and 90 degrees. Graph 40 thus generally illustrates a plot of blade azimuth in degrees and a blade pitch schedule, also in degrees. Graph 40 of FIG. 2 is based on the flight condition specified above.

Figure 3:
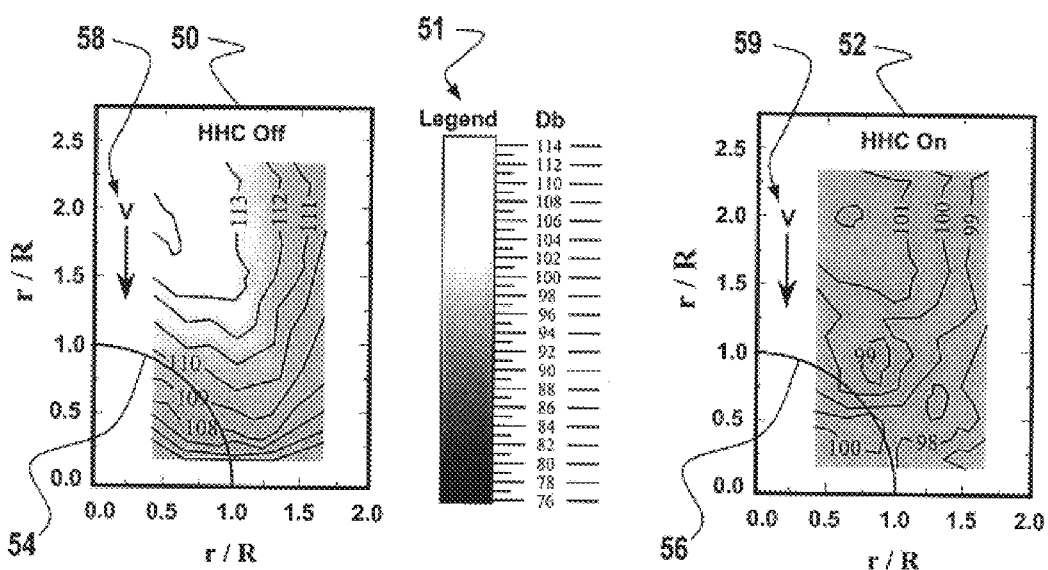
FIG. 3 illustrates graphs measuring the effect of Higher Harmonic Control (HHC) in accordance with preferred embodiments of the present invention.

FIG. 3 illustrates charts 50 and 52 measuring the effect of Higher Harmonic Control (HHC) in accordance with preferred embodiments of the present invention. FIG. 3 Illustrates noise levels measured on a horizontal plane below the advancing side of a rotor. The origin of each chart 50 and 52 is located directly below the center of the rotor, and the arcs 54 and 46 represent the rotor radius. A free stream velocity is indicated from top to bottom as illustrated respectively by arrows 58 and 59 for charts 50 and 52. This forward quadrant on the advancing side of the rotor has been shown to contain the highest BVI noise levels. Note that legend 51 in FIG. 3 indicates BVI noise levels in dB measurements. Chart 50 in FIG. 3 generally indicates the baseline noise levels at the nominal flight condition, while chart 52 depicts BVI noise levels when the HHC input illustrated in FIG. 2 (i.e., oscillating HHC input 42) is introduced. FIG. 3 illustrates the fact that noise levels can be reduced through the quadrant. The peak noise levels illustrated in the upper left hand of each chart 50 and 52 is generally reduced by approximately 12 dB (decibels).

Figure 4:
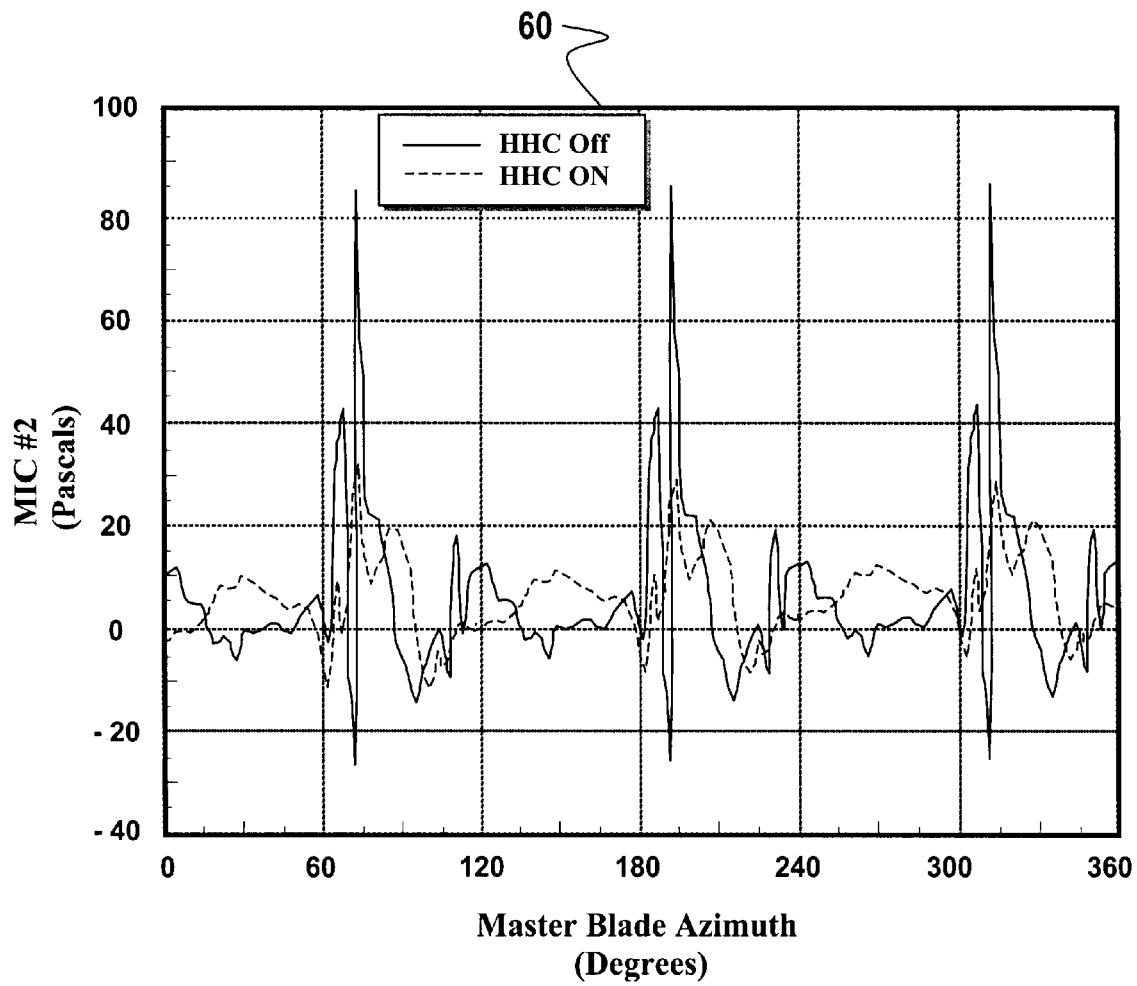
FIG. 4 depicts a graph demonstrating the effect of HHC on acoustic time history at peak directivity, in accordance with preferred embodiments of the present invention.

FIG. 4 depicts a graph 60 demonstrating the effect of HHC on acoustic time history at peak directivity, in accordance with preferred embodiments of the present invention. Those skilled in the art can appreciate that graph 60 illustrates acoustic time history for a microphone located at the peak noise location illustrated in FIG. 3. Graph 60 illustrated in FIG. 4 is based on the flight condition specified above.

Figure 5:
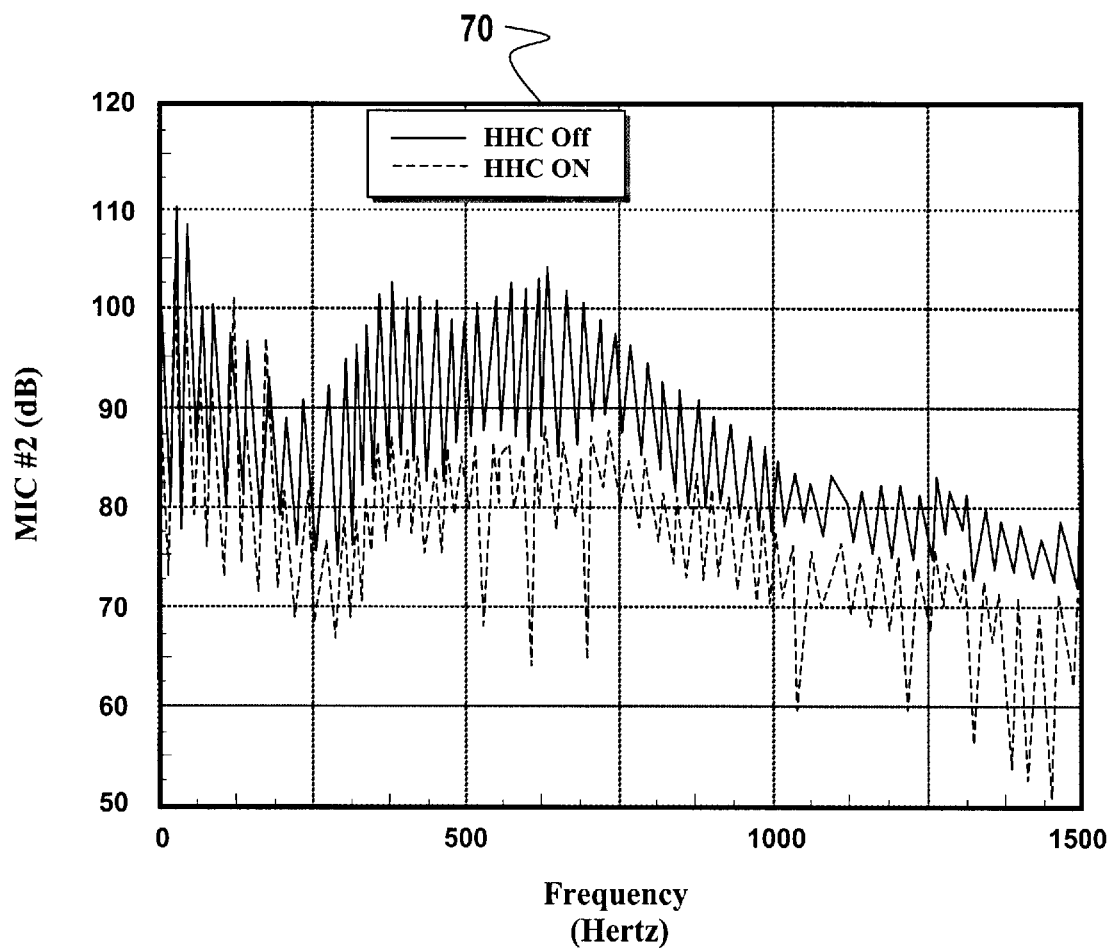
FIG. 5 illustrates a graph illustrating the effect of HHC on the acoustic spectrum at peak directivity, in accordance with preferred embodiments of the present invention.

With the HHC off, a large 3/rev pulse, typical of BVI noise, may be present. When the HHC is turned on, however, the pulses are nearly eliminated. The spectrum of this noise signal is depicted in FIG. 5, wherein the HCC attenuates the particularly objectionable frequencies between 300 Hz and 1500Hz. FIG. 5 thus illustrates a graph 70 illustrating the effect of HHC on the acoustic spectrum at peak directivity, in accordance with preferred embodiments of the present invention. Graph 70 of FIG. 5 is based on the flight condition specified above.

Figure 6:
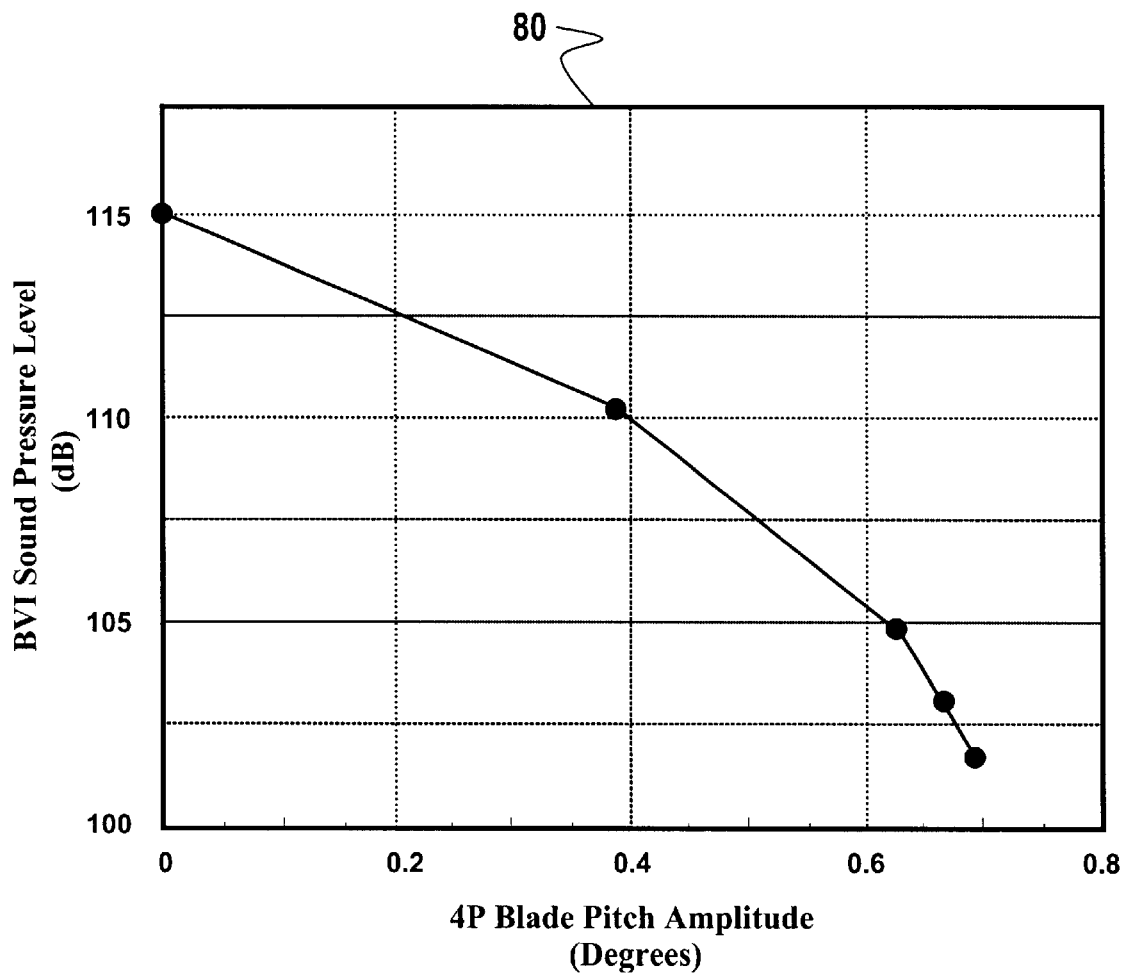
FIG. 6 depicts a graph illustrating noise reduction levels with HCC amplitude, in accordance with preferred embodiments of the present invention.

FIG. 6 depicts a graph 80 illustrating noise reduction levels with HCC amplitude, in accordance with preferred embodiments of the present invention. Graph 80 of FIG. 6 indicates that the BVI noise level decreases as the HHC amplitude is increased. Even greater noise reduction is likely at higher amplitudes, but the control loads may increase also. The choice of amplitude is thus generally a tradeoff between noise reduction and control loads. Graph 80 of FIG. 6 is also based on the flight condition specified above.

Figure 7:
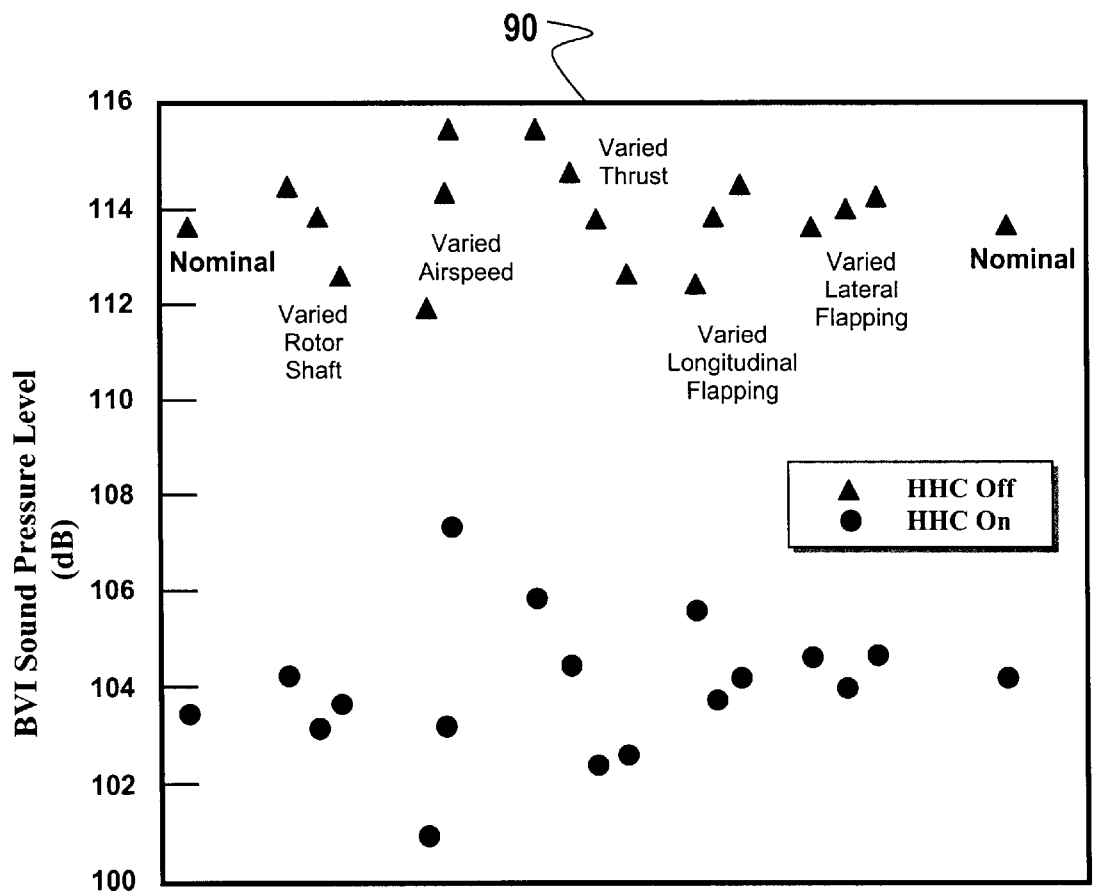
FIG. 7 illustrates a plot depicting the effect of varying trim states on HHC noise reduction, in accordance with preferred embodiments of the present invention.

FIG. 7 illustrates a plot 90 depicting the effect of varying trim states on HHC noise reduction, in accordance with preferred embodiments of the present invention. Plot 90 of FIG. 7 demonstrates that noise reduction can be achieved with a specified HHC input over a range of flight conditions. In compiling plot 90, flight conditions are varied from the nominal flight condition specified above. The airspeed is varied plus and minus 5 percent from the nominal flight condition. Rotor thrust is varied −10 percent and +5 percent from the nominal condition. Rotor shaft angle and flapping are each varied from the nominal condition by plus and minus 1 degree. Plot 90 illustrates the noise reduction by comparing each triangle with a corresponding circle directly below it. In all cases, the specified HHC input can be very effective in reducing the BVI noise level.

Figure 8:
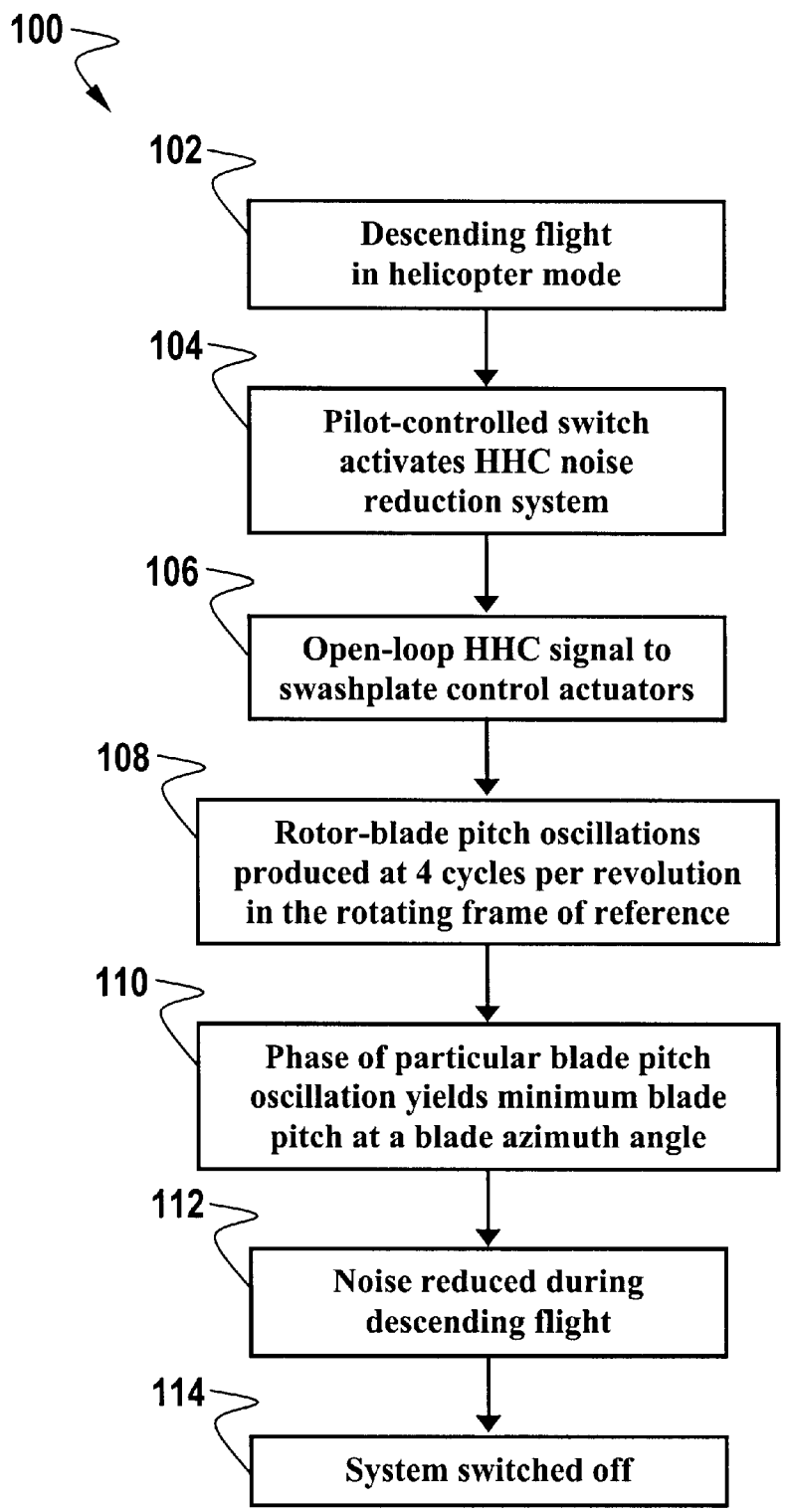
FIG. 8 depicts a high-level flow chart of operations illustrating operational steps that may be implemented to reduce noise generated by tiltrotor aircraft, in accordance with preferred embodiments of the present invention.

FIG. 8 depicts a high-level flow chart 100 of operations illustrating operational steps that may be implemented to reduce noise generated by tiltrotor aircraft, in accordance with preferred embodiments of the present invention. Flow chart 100 represents a general methodology that may be followed in accordance with preferred embodiments of the present invention. Flow chart 100 is presented herein for illustrative purposes only. Those skilled in the art can appreciate that a variety of modifications to flow chart 100, not discussed herein, may be adapted or made to flow chart 100, in accordance with particular embodiments of the present invention.

Thus, as indicated at block 102, a tiltrotor aircraft such as, for example, tiltrotor aircraft 10 of FIG. 1 can begin a descent in helicopter mode. As illustrated next at block 104, a user interface, such as a pilot-controlled switch deployed in the cockpit, can be utilized to activate an HHC noise reduction system, in accordance with the present invention. Generally, a rotor-blade pitch angle associated with the tiltrotor aircraft is controlled utilizing a swashplate connected to rotating blades of the tiltrotor aircraft. Upon activation the HHC noise reduction system utilizing the pilot controlled switch or other user interface/input, one or more higher harmonic control signals (HHC) may be transmitted for input to one or more swashplate control actuators associated with the swashplate, as illustrated in block 106.

Such input can be provided through an open-loop configuration, rather than a closed-loop feedback system. Because an open-loop configuration is utilized in this manner, a predetermined HHC signal input can be transmitted to the swashplate control actuators. In accordance with the present invention, the HHC input to the swashplate control actuators can be designed to produce rotor-blade pitch oscillations at 4 cycles per revolution in the rotating frame of reference, as illustrated at block 108.

The phase of the rotor-blade pitch oscillation is critical, and can be designed to yield a minimum 4/rev component of rotor-blade pitch angle at a particular blade azimuth angle, as indicated at block 110. This angle is preferably between and including 60 degrees and 90 degrees, where the zero degree azimuth position is located where the rotor-blade is aligned directly aft on the aircraft. For particular tiltrotor aircraft, the phase may be optimized for minimum noise at a specific fixed setting within this range. Thereafter, a particular blade pitch oscillation may be produced in the rotating frame of reference in response to the input of the HHC signal to the swashplate control actuator, thereby reducing noise associated with said rotating blades of said tiltrotor aircraft, as depicted at block 112.

The HHC noise reduction may be then switched off, as depicted at block 114. As explained previously, because such an HHC noise reduction system is generally only activated for a short period of time during the operation of the tiltrotor aircraft, the HHC noise reduction system may induce a small, if any, penalty on the life of control system components. The HHC noise reduction system can, however, be switched off at any time, without affecting the flight of the vehicle other than the noise produced.

Those skilled in the art can appreciate that the methodology illustrated in FIG. 8 may be implemented as a program product (i.e., software), in accordance with the methods and systems described herein. Such a program product can be configured as an arrangement of modules. The term "module" as utilized herein generally refers to a collection of routines, subroutines and/or data structures that perform particular tasks or implements particular abstract data types. Modules usually are composed of two parts. First, a module may be composed of an interface, which lists the data types, variable, routines, constants that are generally accessible by other modules, routines, or subroutines. Second, a module may include an implementation, which is private or proprietary in nature (i.e., accessible only to a module) and which contains source code that actually implements the routines in the module. A typical program product may be implemented as signal-bearing media in the form of transmission media or recordable media.

Those skilled in the art can further appreciate that the HHC noise reduction system discussed herein, including methods thereof, may be utilized during other flight conditions, not merely during descending flight. Such an HHC noise reduction system can be activated anytime a reduction in BVI noise generated by the tiltrotor aircraft is desired.

Tiltrotor aircraft thus have great potential to relieve civilian airport congestion and to provide multiple military roles. Low-noise operations can benefit both commercial and military tiltrotor aircraft. The HHC noise reduction methods and systems disclosed herein, including software and hardware implementations thereof, can be implemented on current tiltrotor aircraft such as, for example, the V-22 aircraft, greatly enhancing its ability to perform.

To relieve airport congestion, tiltrotor aircraft may be utilized to carry passengers directly to and from heliports built near city centers. Reduced noise is thus a critical element in the successful implementation of tiltrotor aircraft in commercial air transportation systems. The lower noise levels that can be achieved through implementation of the methods and systems of the present invention can permit tiltrotor aircraft to operate in populated areas, such as city centers, without adverse public reaction. This would greatly enhance the marketability of tiltrotor aircraft currently being developed.

A number of advantages are generally associated with the noise reduction methods and systems of the present invention. The present invention may, for example, be implemented on existing tiltrotor aircraft, without major modifications to the rotor system, and with relatively small costs and additionally, a small weight penalty. The present invention additionally requires no feedback sensors to be installed and maintained. Another advantage of the present invention is that a new rotor design is not required, as some other noise reduction devices do, which would be much more difficult and expensive to implement on existing tiltrotor aircraft.

The noise reduction methods and systems of the present invention, when implemented on tiltrotor aircraft, need only swashplate actuators that can produce the required dynamic motions and control system components that can withstand the resulting oscillatory loads. Structural modifications to existing control systems may not be required on current tiltrotor aircraft because components may already be designed to accommodate maneuvering load levels much higher than those encountered during normal descending flight. It is anticipated that in a preferred embodiment of the present invention, an implemented HHC noise reduction system will only be utilized for a short time (e.g., during descent in helicopter mode) for a given tiltrotor aircraft. Thus, such an HHC noise reduction system may not require a great deal of maintenance.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for reducing noise generated by rotating blades of a tiltrotor aircraft, said method comprising the steps of:

transmitting at least one higher harmonic control signal for input to at least one swashplate control actuator associated with at least one swashplate of a tiltrotor aircraft;

producing at said at least one swashplate control actuator a sinusoidal oscillation of N cycles per rotor revolution in a non-rotating frame of reference associated with said at least one swashplate control actuator;

producing sinusoidal rotor-blade pitch oscillations of said rotating blades at four cycles per rotor revolution in a rotating frame of reference associated with said rotating blades in response to input of said at least one higher harmonic control signal to said at least one swashplate control actuator to thereby reduce noise associated with said rotating blades of said tiltrotor aircraft; and controlling the phase associated with said rotor-blade pitch oscillations of said rotating blades associated with said tiltrotor aircraft utilizing said at least one swashplate under the control of said at least one swashplate control actuator, wherein the phase of said rotor-blade pitch oscillations yields a minimum 4/rev component of rotor-blade pitch angle at a rotor-blade azimuth angle within a range from 60 degrees up to and including 90 degrees.

2. The method of claim 1 wherein the step of transmitting at least one higher harmonic control signal for input to said at least one swashplate control actuator associated with said at least one swashplate, further comprises the step of:

transmitting at least one higher harmonic control signal for input to at least one swashplate control actuator associated with said swashplate, in response to user input.

3. The method of claim 2 wherein said at least one higher harmonic control signal is transmitted to said at least one swashplate control actuator through an open-loop configuration.

4. The method of claim 1 wherein said at least one higher harmonic control signal is transmitted to said at least one swashplate control actuator through an open-loop configuration.

5. The method of claim 4 wherein the step of transmitting at least one higher harmonic control signal for input to said at least one swashplate control actuator associated with said at least one swashplate, further comprises the step of:

transmitting at least one higher harmonic control signal for input to at least one swashplate control actuator associated with said swashplate, in response to user input.

6. The method of claim 1 wherein the step of controlling the phase associated with said rotor-blade pitch oscillations of said rotating blades associated with said tiltrotor aircraft utilizing said at least one swashplate under the control of said at least one swashplate control actuator to thereby reduce noise associated with said rotating blades of said tiltrotor aircraft, further comprises the step of:

optimizing said phase associated with said rotor-blade pitch oscillations for minimum noise at a fixed phase setting.

7. The method of claim 6 further comprising the step of:

optimizing said phase associated with said rotor-blade pitch oscillations for flight conditions and/or descent profiles associated with said tiltrotor aircraft.

8. The method of claim 7 wherein said at least one higher harmonic control signal is transmitted to said at least one swashplate control actuator through an open-loop configuration.

9. The method of claim 8 wherein the step of transmitting at least one higher harmonic control signal for input to said at least one swashplate control actuator associated with said at least one swashplate, further comprises the step of:

transmitting at least one higher harmonic control signal for input to at least one swashplate control actuator associated with said swashplate, in response to user input.

10. The method of claim 6 wherein the step of transmitting at least one higher harmonic control signal for input to said at least one swashplate control actuator associated with said at least one swashplate, further comprises the step of:

transmitting at least one higher harmonic control signal for input to at least one swashplate control actuator associated with said swashplate, in response to user input.

11. The method of claim 10 wherein said at least one higher harmonic control signal is transmitted to said at least one swashplate control actuator through an open-loop configuration.

12. The method of claim 6 wherein said at least one higher harmonic control signal is transmitted to said at least one swashplate control actuator through an open-loop configuration.

13. The method of claim 12 wherein the step of transmitting at least one higher harmonic control signal for input to said at least one swashplate control actuator associated with said at least one swashplate, further comprises the step of:

transmitting at least one higher harmonic control signal for input to at least one swashplate control actuator associated with said swashplate, in response to user input.

14. A system for reducing noise generated by rotating blades of a tiltrotor aircraft, said system comprising:

at least one swashplate control actuator associated with said tiltrotor aircraft adapted to receive input of at least one higher harmonic control signal; and at least one swashplate associated with said swashplate control actuator, said at least one swashplate connected to said rotating blades of said tiltrotor aircraft by pitch links for controlling rotor-blade pitch angles;

wherein rotor-blade pitch oscillations of said rotating blades are produced at four cycles per revolution in a rotating frame of reference associated with said rotating blades, and wherein the phase of said rotor-blade pitch oscillations yields a minimum 4/rev component of rotor-blade pitch angle at a rotor-blade azimuth angle within a range from 60 degrees up to and including 90 degrees in response to input of said at least one higher harmonic control signal to said at least one swashplate control actuator to thereby reduce noise associated with said rotating blades of said tiltrotor aircraft.

15. The system of claim 14 further comprising a user input interface wherein said at least one higher harmonic control signal is transmitted for input to said at least one swashplate control actuator associated with said at least one swashplate in response to user input to said user interface.

16. The system of claim 14 wherein said system is configured as an open-loop system and said at least one higher harmonic control signal is transmitted to said at least one swashplate control actuator through an open-loop configuration.

17. The system of claim 16 further comprising a user input interface wherein said at least one higher harmonic control signal is transmitted for input to said at least one swashplate control actuator associated with said at least one swashplate in response to user input to said user interface.

\* \* \* \* \*